United States Patent
Rene et al.

[11] Patent Number: 6,012,489
[45] Date of Patent: Jan. 11, 2000

[54] COMPRESSION VALUE ASSEMBLY APPLIED TO A HERMETIC COOLING COMPRESSOR

[75] Inventors: Manuel Escriba Rene; Juan Angulo Gomez, both of Terrassa, Spain

[73] Assignee: Electrolux Espana, S.A., Madrid, Spain

[21] Appl. No.: 09/065,190

[22] Filed: Apr. 23, 1998

[30] Foreign Application Priority Data

Apr. 29, 1997 [ES] Spain ................................. 9700925

[51] Int. Cl.[7] ............................................ F16K 15/16
[52] U.S. Cl. ................................... 137/856; 137/857
[58] Field of Search .............................. 137/856, 857, 137/855

[56] References Cited

U.S. PATENT DOCUMENTS

| | | | |
|---|---|---|---|
| 2,154,880 | 4/1939 | Twigg | 137/857 |
| 4,723,896 | 2/1988 | Fritchman | 137/856 X |
| 5,110,272 | 5/1992 | Peruzzi et al. | 137/856 X |
| 5,738,502 | 4/1998 | Lee | 137/856 X |
| 5,769,126 | 6/1998 | Cho | 137/856 |

FOREIGN PATENT DOCUMENTS 0582712  2/1994  European Pat. Off. .

*Primary Examiner*—Denise L. Ferensic
*Assistant Examiner*—Joanne Y. Kim
*Attorney, Agent, or Firm*—Pearne, Gordon, McCoy & Granger LLP

[57] ABSTRACT

An improved valve mounting assembly for a hermetically sealed compressor. The valve mounting assembly includes a valve, a damper, and a retention yoke. The valve, valve damper, and retention yoke cooperate to provide a valve mounting arrangement having high efficiency and low noise. The retention yoke includes an extension which is received between a yoke attachment and a valve plate. The extension is formed from a vibration attenuating material and reduces the communication of vibrations from the valve and valve plate to the yoke attachment. The retention yoke retains the valve and damper in position, and serves as a bumper to back up the damper and limit movement of the damper and valve.

17 Claims, 4 Drawing Sheets

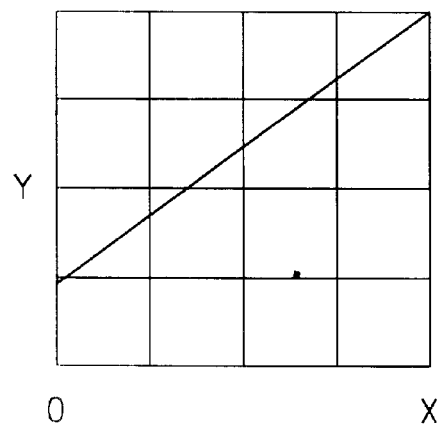
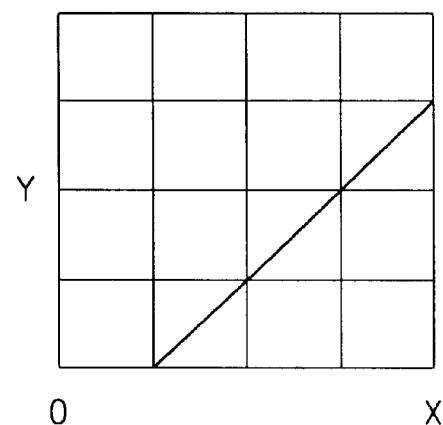
FIG. 1        FIG. 2
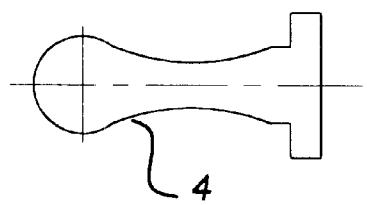
FIG. 6
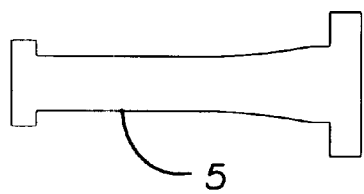
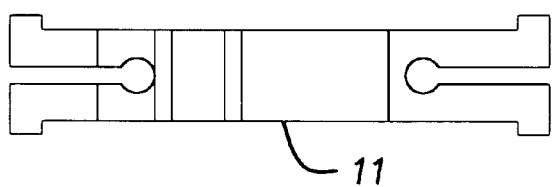
FIG. 7        FIG. 8

6,012,489

COMPRESSION VALUE ASSEMBLY APPLIED TO A HERMETIC COOLING COMPRESSOR

BACKGROUND OF THE INVENTION

1. Field of the Invention

The present invention generally relates to hermetic cooling compressors and, more specifically, to fastening a compression valve onto a valve plate arranged in the yoke of a compressor, and a method of operating such a compression valve.

2. Description of Related Art

Hermetic cooling compressors are composed of a compressor unit and an electric motor which are disposed within a hermetically sealed casing. The compressor unit is formed by a main body supporting a crankshaft. The crankshaft is rotatably powered by the electric motor. The main body contains a hollow cylinder through which the piston reciprocally travels, compressing the cooling gas. A valve plate and yoke assembly are mounted at one end of the cylinder. Proper functioning of the valves and ducts through which the aspirated and compressed gases pass is very important since, to a great extent, the results of the compressor depend on these valves and ducts to supply a satisfactory level of energetic efficiency and a low level of noise. High energy efficiency and low noise are essential features in hermetic compressors, since it reflects advantageously in the operational cost of the compressor, which is used in high production volume appliances.

There are various known solutions that attempt to meet, more or less satisfactorily, the aforementioned operating requirements. U.S. Pat. No. 4,723,896 and EP 582,712 are exemplary of the art. Both of these publications disclose valve assembly plates similar to those described above. However, in the valve assembly plates described in these patents, the levels of efficiency and/or noise emission, as well as the simplicity of design do not meet those achieved by the present invention.

The energy efficiency of hermetic compressors is partially determined by the response time for opening the compression valve. The compression valve response time depends, partially, on the type of valve mounting employed. It is known to use preloaded compression valves having a force normally directed toward the closing surface of the compression duct provided by the mounting system itself. When the piston, in its reciprocating motion, begins the compression stroke, the compression valve remains closed for a short time until the pressure inside the cylinder has balanced the pressure in the yoke plus the preloaded force of the valve. The displacement (x-axis) versus compression force (y-axis) is shown graphically in FIG. 1 (preloaded valve) and FIG. 2 (valve not preloaded).

One of the causes of noise in this type of compressor is related to opening and closing impact of the compression valve. The noise thus generated by the valve is transmitted as sound waves through the air and also structurally through components in direct contact with the valve assembly and radiate to the exterior through the casing of the compressor.

The compression/damper valve assembly in the abovenoted patents is mounted by means of a system of yokes possessing at least two elements. One of the elements serves as a bumper or stop for the valve and the other as a mounting element. The solution proposed in the aforementioned patents, therefore, requires the manufacture of at least two parts, which is economically undesirable.

Accordingly, there exits a need in the art for an economical and quiet valve plate for a hermetic compressor.

SUMMARY OF THE INVENTION

In accordance with the present invention, a compression valve mounting system is designed so that, first, there is no preload force on the valve and, second, the valve opens during the initial stage (until coming in contact with a damper), rotating about a line of fixation between the damper and a rounded seat of a valve plate so that valve opening response time and closing impact force are noticeably improved, with the consequent reduction in the level of noise generation and transmission.

In further accordance with the present invention, a retention yoke secures the valve-damper assembly to a valve plate, and defines a valve bumper or stop. Accordingly, the present invention reduces the number of components required for mounting the valve-damper assembly.

In further accordance with the present invention, a compression valve attachment system acts as insulation against the transmission of noise. An extension of the retention yoke is interposed between the valve plate and the attachment yoke.

BRIEF DESCRIPTION OF THE DRAWINGS

These and further features of the present invention will be apparent with reference to the following description and drawings, wherein:

FIG. 1 graphically illustrates opening of a preloaded valve, with the ordinate being compression force and the abscissa being opening displacement.

FIG. 2 graphically illustrates opening of a non-preloaded valve, with the ordinate being compression force and the abscissa being opening displacement.

FIG. 6 is a top plan view of the compression valve.

FIG. 7 is a top plan view of the compression valve damper.

FIG. 8 is a top plan view of the yoke/bumper attachment of the compression/damper valve assembly.

DETAILED DESCRIPTION OF THE PREFERRED EMBODIMENTS

Figure 3B:
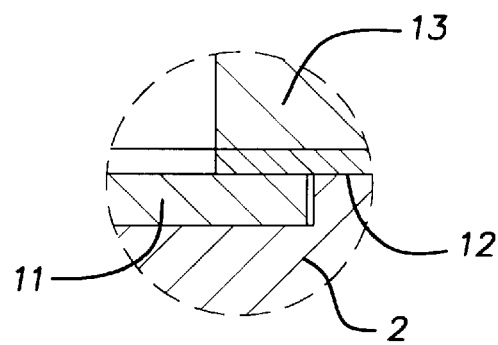
FIG. 3b is an enlarged sectional view of a detail from FIG. 3a, illustrating an extension of the yoke assembly adjacent the yoke.

It should be noted that in the detailed description which follows, identical components have the same reference numeral, regardless of whether they are shown in different embodiments of the present invention. It should also be noted that, in order to clearly and concisely disclose the present invention, the drawings may not necessarily be to scale and certain features of the invention may be shown in somewhat schematic form.

Figure 3A:
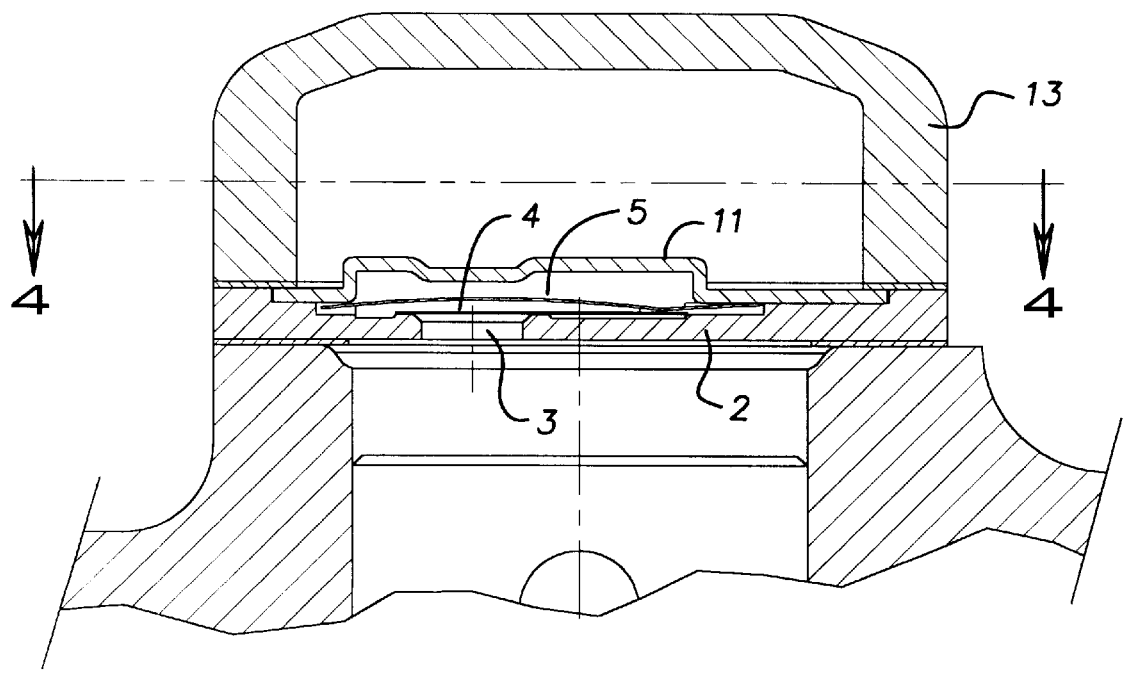
FIG. 3a is a cross-sectional view of a valve plate and an attachment yoke as seen along line III—III of FIG. 4.
Figure 4:
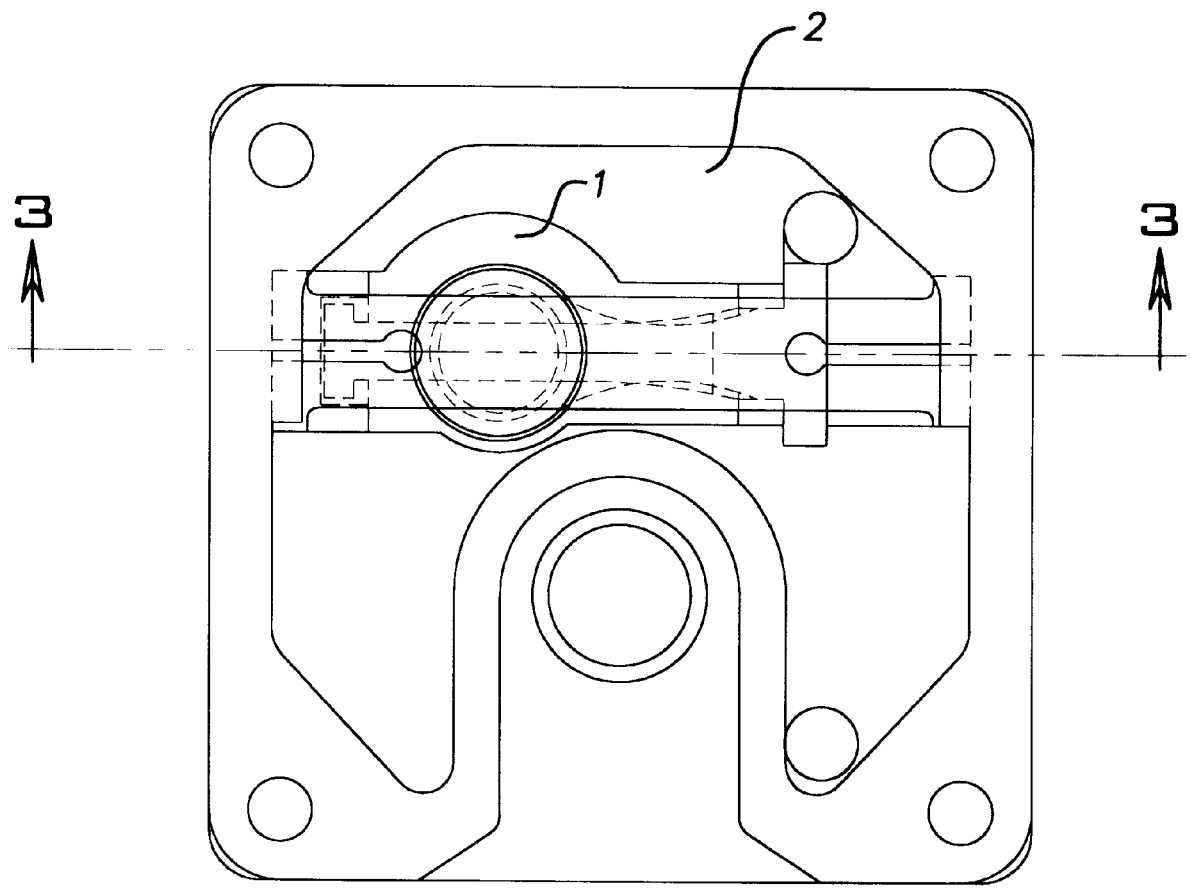
FIG. 4 is a top plan view of the compressor with a valve plate as seen along line IV—IV of FIG. 3a, wherein the dotted lines show the compression valve and damper superimposed.

With reference to FIGS. 3a–4, a first preferred embodiment of the present invention is shown to include a compression valve 4, a damping spring 5, and an attachment yoke 11. The compression valve 4 is constructed of high quality strip steel, and is mounted in a recess 1 formed in the surface of a valve plate 2. Accordingly, the "dead space" or residual volume 3 in the cylinder due to the empty volume of the compression duct is reduced and, thus, the volumetric output of the compressor is improved.

The damping spring 5 is vertically adjacent the compression valve 4 and disposed between the compression valve 4 and the attachment yoke 11. The damping spring 5 resists the opening motion of the compression valve 4. The attachment yoke 11 overlies the compression valve 4 and damping spring 5, and is preferably made as one unitary piece.

According to the first embodiment, the compression valve 4 would operate in a manner similar to that of the other valves of this type described in the background section, with a vertical deforming motion. However, the attachment yoke 11 also provides an extension 12 which serves as a bumper to attenuate transmission of vibration and noise from the compression valve 4 via the retention yoke 11. The extension 12 is interposed between retention yoke 11, the valve plate 2, and the yoke attachment 13, as shown best in FIG. 3b. The extension 12, due to the fact that it is made of synthetic, non-metallic material, serves as insulation and attenuates vibration from the valve 4 directed toward the yoke attachment 13 via the retention yoke 11 and valve plate 2. Consequently, compressor sound level is reduced.

As illustrated in FIGS. 3a and 3b, a first portion of the retention yoke 11 secures the compression valve and damper to the compressor. A second portion of the retention yoke serves as a bumper for reducing transmission of vibrations to a yoke attachment of the compressor. The second portion of the retention yoke includes an upper surface bearing on a first portion of a lower surface of an insulating material. A second portion of the lower surface of the insulating material is longitudinally adjacent the first portion of the lower surface and contacts the valve plate. An upper surface of the insulating material contacts the yoke attachment. The second portion of the retention yoke is received in a recess formed in the valve plate. In this arrangement the upper surface of the second portion of the retention yoke is in a plane coextensive with an unrecessed portion of the valve plate.

Figure 5B:
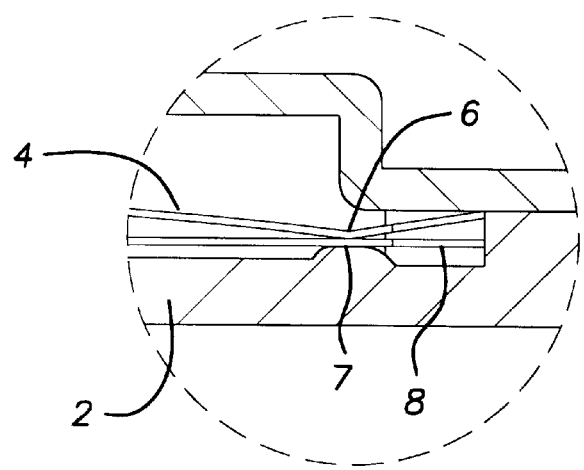
FIG. 5b is an enlarged sectional view of a detail from FIG. 5a, illustrating a portion of the compression valve rotation axis.
Figure 5A:
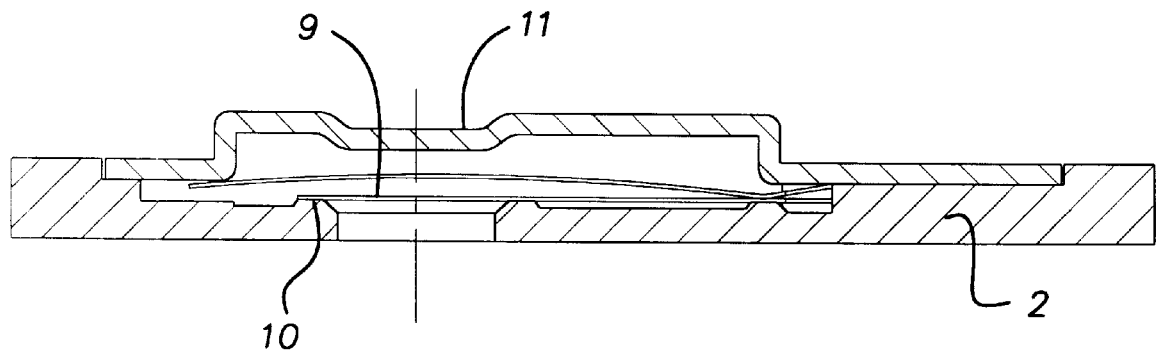
FIG. 5a is a cross-sectional view of a valve plate and attachment yoke, in accordance with a second preferred embodiment of the present invention.

With reference to FIGS. 5a and 5b, a second embodiment of the present invention is illustrated. The second embodiment without a preloaded valve, dampens opening motion of the compression valve 4. As shown best in FIG. 5b, the damper 5 has a crease 6 that coincides with a protuberance 7 formed on the circular section of the valve plate 2. A first or secured end 8 of the compression valve 4 is sandwiched between the crease 6 and the protuberance 7. The opposite or free end 9 of the valve 4 rests on top of a circular seating 10 surrounding the compression duct. Thus, during a compression stroke, the valve 4 initially rotates, without bending, about its attachment axis, which is defined by the crease 6. This arrangement causes the valve 4 to be more sensitive on opening, behaving as indicated in FIG. 2, thus bringing about improved efficiency. This arrangement also reduces the closing impact of the valve 4 and thereby reduces the level of noise produced by the compressor.

The valve plate retention yoke 11 of the valve/damper assembly is different from those known in the art. It consists of a single piece of steel plate bent or profiled with a die tool so that the manufacturing cost is lower than that for other known solutions. In addition, the retention yoke 11 also has the dual functions of valve bumper or stop and attachment. It must be kept in mind that other solutions known in the art require two parts to perform these two functions. Therefore, the present invention provides a significant savings in the cost of manufacturing and assembly.

While the preferred embodiment of the present invention is shown and described herein, it is to be understood that the same is not so limited but shall cover and include any and all modifications thereof which fall within the purview of the invention.

What is claimed is:

1. Compression valve assembly for a hermetic cooling compressor, said assembly comprising three superimposed strips of high quality steel secured to a valve plate and overlying a gas outlet compression duct which extends through said valve plate, a first of said three strips is in contact with a seat of the compression duct and serves as a compression valve, a second of said three strips overlies said compression valve and serves as a valve damper, and a third of said three strips overlies said valve damper and serves as a retention yoke for the damper and compression valve, said compression valve having a first end overlying the compression duct and a second freely movable end, said retention yoke being formed from a bent steel plate having a stepped and segmented profile, wherein a first portion of said retention yoke secures the compression valve and damper to said compressor and a second portion of said retention yoke serves as a bumper for reducing transmission of vibrations to a yoke attachment of the compressor, said second portion of said retention yoke including an upper surface bearing on a first portion of a lower surface of an insulating material, a second portion of the lower surface of the insulating material being longitudinally adjacent the first portion of the lower surface and contacting the valve plate, and an upper surface of the insulating material contacting the yoke attachment, wherein the valve plate has a protuberance that defines a rotational axis for the compression valve about which said compression valve second end rotates.

2. Compression valve assembly according to claim 1, wherein the compression valve has a first section disposed on the seat of the compression duct, and a second rectangular section having an axis of symmetry perpendicular to a longitudinal axis of the valve, said second section being at an end of the valve which is attached to the damper.

3. Compression valve assembly according to claim 2, wherein the first section of the compression valve has a semi-circular shape.

4. Compression valve assembly according to claim 3, wherein the damper has an end defining a first, rectangular section, a second rectangular section oriented perpendicularly to an axis of the damper, and an intermediate, rectangular, longitudinal section, said intermediate section having a crease formed therein.

5. Compression valve assembly according to claim 4, wherein the creases coincides with the protuberance arranged on the valve plate.

6. Compression valve assembly according to claim 1, wherein ends of the retention yoke are L-shaped and are received in recesses formed in the valve plate, and a central area of the retention yoke has a stepped segment extending toward, and coinciding with, the compression duct, said stepped segment serving as a support for the expanded compression valve during the outflow of said gases.

7. Compression valve assembly according to claim 1, wherein the valve plate is made from a non-metallic material that insulates against vibrations.

8. Compression valve assembly according to claim 1, wherein the valve plate defines a recast space which receives the damper and compression valve and the attachment yoke, said valve plate comprising:
- at least two stepped grooves in which the L-shaped ends of the retention yoke are arranged,
- a further stepped groove in which first ends of the compression valve and damper are arranged,
- at least two lateral bumpers equal in length to inner sides of the first ends of the valve and damper,
- at least one step for a second, free end of the damper,
- at least one lateral groove adjacent at least one side of said outlet duct seat;
- said protuberance coinciding with a crease in the damper, said protuberance defining the rotational axis for the steel strip of the compression valve during initial opening of the valve caused by pressurized gases flowing through the compression duct.

9. Compression valve assembly according to claim 1, wherein the second portion of the retention yoke is received in a recess formed in the valve plate such that the upper surface of the second portion of the retention yoke is in a plane coextensive with an unrecessed portion of the valve plate.

10. Compression valve assembly for a hermetic cooling compressor, said assembly comprising three superimposed strips of high quality steel secured to a valve plate and overlying a gas outlet compression duct which extends through said valve plate, a first of said three strips is in contact with a seat of the compression duct and serves as a compression valve, a second of said three strips overlies said compression valve and serves as a valve damper, and a third of said three strips overlies said valve damper and serves as a retention yoke for the damper and compression valve, said compression valve having a first end overlying the compression duct and a second freely movable end, said retention yoke being formed from a bent steel plate having a stepped and segmented profile, wherein a first portion of said retention yoke secures the compression valve and damper to said compressor and a second portion of said retention yoke serves as a bumper for reducing transmission of vibrations to a yoke attachment of the compressor, said second portion of said retention yoke including an insulating material interposed between the valve plate and the yoke attachment, wherein the valve damper has a crease and the valve plate has a protuberance coinciding with the crease, the protuberance defining a rotational axis for the compression valve about which said compression valve second end rotates.

11. Compression valve assembly according to claim 10, wherein the compression valve has a first section disposed on the seat of the compression duct, and a second rectangular section having an axis of symmetry perpendicular to a longitudinal axis of the valve, said second section being at an end of the valve which is attached to the damper.

12. Compression valve assembly according to claim 11, wherein the first section of the compression valve has a semi-circular shape.

13. Compression valve assembly according to claim 12, wherein the damper has an end defining a first, rectangular section, a second rectangular section oriented perpendicularly to an axis of the damper, and an intermediate, rectangular, longitudinal section, said intermediate section having the crease formed therein.

14. Compression valve assembly according to claim 10, wherein ends of the retention yoke are L-shaped and are received in recesses formed in the valve plate, and a central area of the retention yoke has a stepped segment extending toward, and coinciding with, the compression duct, said stepped segment serving as a support for the expanded compression valve during the outflow of said gases.

15. Compression valve assembly according to claim 10, wherein the valve plate is made from a non-metallic material that insulates against vibrations.

16. Compression valve assembly according to claim 10, wherein the second portion of the retention yoke has an upper surface bearing on a first portion of a lower surface of the insulating material, a second portion of the lower surface of the insulating material being longitudinally adjacent the first portion of the lower surface and contacting the valve plate, and an upper surface of the insulating material contacting the yoke attachment.

17. Compression valve assembly according to claim 16, wherein the second portion of the retention yoke is received in a recess formed in the valve plate such that the upper surface of the second portion of the retention yoke is in a plane coextensive with an unrecessed portion of the valve plate.

* * * * *

UNITED STATES PATENT AND TRADEMARK OFFICE
CERTIFICATE OF CORRECTION

PATENT NO. : 6,012,489
DATED : January 11, 2000
INVENTOR(S) : Rene et al.

It is certified that error appears in the above-indentified patent and that said Letters Patent is hereby corrected as shown below:

Title page: Item [54] and Column 1, line 1, delete "VALUE" and insert --VALVE--.

Column 1, Line 62, delete "abovenoted" and insert --above-noted--.

Column 4, Line 56, Claim 5, delete "creases" and insert --crease--.

Signed and Sealed this

Seventh Day of November, 2000

Attest:

Q. TODD DICKINSON

*Attesting Officer*     *Director of Patents and Trademarks*